Sept. 29, 1970     R. L. BODKINS     3,531,553
METHOD OF INJECTION MOLDING OLEFIN PLASTIC ARTICLES
WITH A FOAMED INTERIOR AND UNFOAMED SURFACE
Filed Nov. 13, 1967
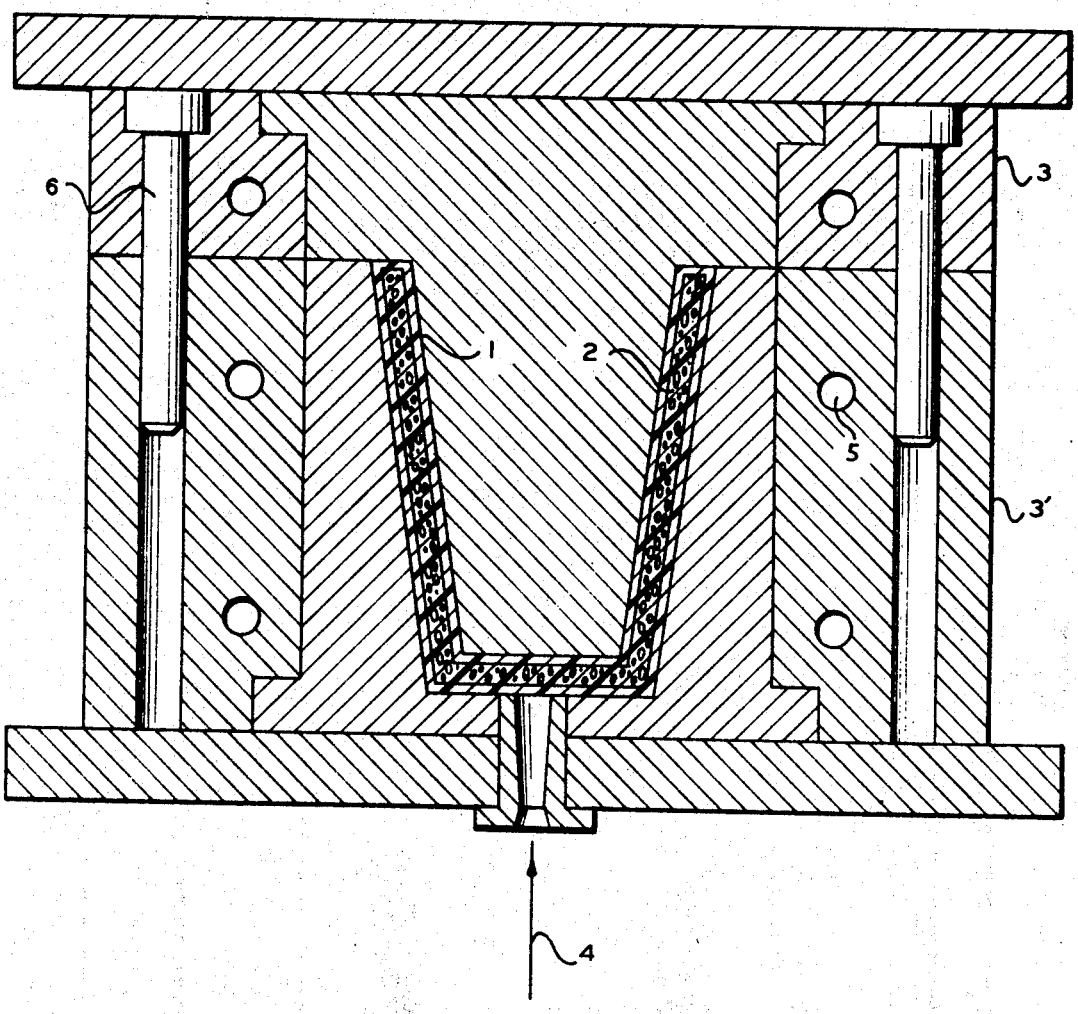
INVENTOR.
R. L. BODKINS
BY
ATTORNEYS United States Patent Office 3,531,553
Patented Sept. 29, 1970

3,531,553
METHOD OF INJECTION MOLDING OLEFIN PLASTIC ARTICLES WITH A FOAMED INTERIOR AND UNFOAMED SURFACE
Roy L. Bodkins, Bartlesville, Okla., assignor to Phillips Petroleum Company, a corporation of Delaware
Filed Nov. 13, 1967, Ser. No. 682,283
Int. Cl. B29d 23/02
U.S. Cl. 264—45                          6 Claims

ABSTRACT OF THE DISCLOSURE

A method for producing a molded article having a foamed interior and a nonfoamed glossy exterior comprising: providing a first section of olefin polymer at elevated temperature and pressure which does not contain a foaming agent and a second section of olefin polymer at elevated temperature and pressure containing a foaming agent, injecting the first section and then the second section into a mold which is at a pressure below that of the polymers and a temperature below 100° F.

---

This invention relates to a new and improved method of molding polymers. This invention also relates to a new and improved method for forming articles having a glossy, nonfoamed surface and a foamed interior.

Heretofore it has been thought that in injection molding foamable compositions of polymers of 1-olefins it was necessary to use high mold temperatures, i.e., at least 265° F., in order to produce a part which had a smooth, glazed (glossy) surface. Lower mold temperatures tended to produce a grainy surface somewhat in appearance to that of wood. It is advantageous to use low mold temperatures, e.g., around 50° F., because the low temperatures decrease the time needed for the heated polymer to harden and therefore substantially shortens the cycle time for molding operations providing increased production over previously known methods.

According to this invention it is possible to produce a molded polymeric article having a foamed interior and a substantially nonfoamed, glossy surface using low mold temperatures. In injection molding the set quantity of polymer feed injected into the mold is called a shot. In the present invention the shot is composed of two or more separate polymer compositions. In this specification the shot will be referred to as being composed of the first, second, etc., sections passing sequentially. The polymer feed to be molded contains at least two sections, at least one of the sections being foamable, the unfoamable first section (or sections) comprising from about 25 to about 85, preferably from about 25 to about 45, weight percent of said polymer feed, the remainder of said polymer feed being composed of the foamable second section (or sections). The polymer feed is injected under conditions which cause foaming of the second section (or sections) as it enters the mold. The mold is initially at a temperature of not more than 100° F. so that the first section (or sections) is injected into the mold ahead of the second section (or sections).

By this process foamed polymers of 1-olefins are molded into parts which have a glossy rather than grainy surface and this is accomplished using a low temperature mold. Heretofore such a combination of results and low mold temperatures was not thought possible.

The process of this invention produces useful products such as tumblers, waste paper baskets, and the like.

Accordingly, it is an object of this invention to provide a new and improved molding process.

It is another object of this invention to provide a new and improved method for making foamed polymeric articles having glossy surfaces.

It is another object of this invention to provide a new and improved method for forming molded polymeric articles having a foamed interior and a substantially nonfoamed, glossy surface.

It is yet another object of this invention to provide a new and improved method for forming molded articles from foamed polymer using low mold temperature but yet obtaining a molded article having a glossy surface.

Other aspects, objects, and the several advantages of this invention will be apparent to one skilled in the art from the following description, drawing, and appended claims.

According to this invention the polymer feed is heated, preferably at a temperature in the range of from about 190° to about 700° F. The polymer feed is composed of at least two sections, at least one first section being composed of unfoamable polymer and at least one second section being composed of foamable polymer. Generally, the polymer feed is maintained under a pressure sufficiently elevated so that the foamable second section does not foam until introduced into the mold which is maintained at a lower pressure, e.g., ambient pressure. The foamable second section contains any conventional foaming agent which is activated at or below the temperature at which the polymer feed is heated.

The drawing shows an article produced by this invention which article comprises an outer glossy, substantially nonfoamed surface or skin 1 containing a substantially foamed interior 2, skin 1 having been formed initially by first injecting unfoamable polymer into the mold and foamed interior 2 having been formed by injecting foamable polymer into the mold after the polymer which formed skin 1 was injected into the mold. The mold is defined by mold halves 3, 3' which are cooled by way of channels 5 and aligned by way of pins 6. The polymer feed is injected into the mold cavity defined by mold halves 3, 3' in the direction of arrow 4.

In forming the polymer feed, it is important that the unfoamable first section(s) of that feed comprises from about 25 to about 85, preferably from about 25 to about 45, weight percent of the total polymer feed. If this balancing of the foamable and unfoamable sections is not maintained, the results of the invention, i.e., a molded article having a foamed interior and a substantially nonfoamed, glossy surface, will not be obtained. For example, if too much of the foamable polymer is employed the foamed polymer will not be contained in the interior of the molded article but will extend through to the surface of the article thereby destroying the desired glossy surface for the final article. Alternatively, if an insufficient amount of the foamable polymer is employed the interior of the article will not be foamed to the desired extent thereby providing an article of heavier weight than desired. If insulating characteristics are desired, this latter result will defeat the insulating characteristics provided by the foamed interior.

The polymer feed is in a foamable condition when heated but does not foam while under elevated pressure, i.e., a pressure of at least 100 p.s.i.a. is required to maintain a solid solution. The polymer feed does foam when injected into a mold which is at a pressure sufficiently below the elevated pressure under which the polymer feed is maintained to cause foaming of the foamable polymer. Generally, the mold will be at atmospheric pressure. The mold can be any conventional mold known in the art and is preferably one which is initially at a temperature of not more than 100° F. and which is externally cooled, e.g., by cooling water circulating in jackets around the mold, so that the temperature of the mold during the time in which the heated polymer is injected thereinto and cooled therein does not exceed about 100° F.

The polymer feed is injected into the mold so that the unfoamable polymer enters the mold first followed by the foamable polymer. By this sequence of steps a substantially nonfoamed, glossy surface is obtained while the interior of the molded article is composed essentially of foamed polymer. Although not known to a certainty and therefore not desiring to be bound thereby, it presently appears that by injecting the unfoamable polymer into the mold first all the surfaces of the mold are coated with unfoamable polymer and then the remaining interior of the mold is filled with foamed polymer.

The polymer feed can be composed of a single lot of polymer wherein the foamed and unfoamed sections are contiguous with one another such as in a single screw injection molding machine and are lined up so that the unfoamable polymer sections enter the mold first followed by the foamable sections. The polymer feed can also be composed of separate sections, for example using a conventional double screw injection machine, so that the unfoamable polymer is in one separate section and the foamable polymer is in another separate section. The unfoamable section is then injected into the mold first by a first screw followed substantially immediately by the injection of the separate, foamable second section by way of the second screw.

Generally, any polymer which can be injection molded and foamed can be employed in this invention. Preferred are homopolymers, copolymers, and mixtures thereof formed from one or more 1-olefins having 2 to 8 carbon atoms per molecule, inclusive. Examples of suitable monomers include ethylene, propylene, butene-1, octene, and the like. Preferred polymers are homopolymers of ethylene and propylene and copolymers of two or more of ethylene, propylene, and butene-1.

The polymer section which is to be foamed can be rendered foamable by incorporating therein any conventional foaming agent which will at least partially liberate a gaseous material when heated to a temperature in the range of from about 190° to about 700° F. Suitable foaming agents include N,N'-dinitrosopentamethylenetetramine, alkali metal carbonates such as sodium carbonate and sodium bicarbonate, ammonium carbonate, ammonium bicarbonate, azodicarbonamide, 4,4'-oxy-bis-(benzenesulfonyl hydrazide), azobisisobutyronitrile, benzene-1,3-disulfonylhydrazide, diazoaminobenzene, barium azodicarboxylate, and the like. The amount of foaming agent employed in the polymer to be foamed can vary widely depending upon the polymer, the degree of foaming desired, the temperature of heating employed, and the like but will generally be in the range of from about 0.1 to about 5 parts per 100 parts by weight of polymer to be foamed. Of course, conventional temperature control agents for lowering or raising the temperature at which the foaming agent is activated to form the gaseous material, and dispersing agents such as mineral oil, dioctylphthalate, liquid polyisobutylene, and the like can be employed.

The polymer employed can also include conventional additives such as antioxidants or other stabilizers, pigments, plasticizers, antistatic agents, crosslinking agents, and the like.

EXAMPLE

A mold similar to that shown in the drawing and maintained substantially at 65° F. by circulating cooling water through a jacket around the mold halves was used to form a waste paper basket similar in shape to that shown in the drawing and having an outer, glossy, substantially nonfoamed skin 1 and an inner foamed area 2.

The polymer used as the unfoamable material to form skin 1 was a homopolymer of propylene having a melt flow of 5 (ASTM D1238–62T, Condition L) and a density of .905 gram per cubic centimeter at 25° C. The polymer used to form the foamed core 2 was a homopolymer of ethylene having a density of .955 gram per cubic centimeter at 25° C., the polyethylene containing 3 weight percent of azodicarbonamide as the foaming agent. The foamable polyethylene polymer weighed about 439.5 grams and constituted about 65.7 weight percent of the polymer feed, the unfoamed polypropylene section of the polymer feed weighing 229.6 grams and constituting about 34.3 weight percent of the polymer feed.

The polymer feed was situated in an extruder manufactured by the NRM Corporation of Akron, Ohio, so that the unfoamable polypropylene would enter the mold first and the polymer feed was heated in the extruder to an extrusion temperature of about 475° F. and a pressure of at least 100 p.s.i.a. Thereafter, the polymer feed was extruded into the mold and after 1 minute mold halves 3, 3' are separated and the molded waste paper basket removed therefrom. The thus molded article contained a foamed core having an unfoamed, glossy surface coating all sides of the foamed core.

Reasonable variations and modifications are possible within the scope of this disclosure without departing from the spirit and scope thereof.

That which is claimed is:

1. A method for producing a molded article having a substantially foamed interior and a substantially nonfoamed, glossy surface comprising: providing a polymer feed, at a temperature within the range of 190 to 700° F. and a pressure of at least 100 p.s.i.a., said feed comprising a first section of a polymer of at least one olefin having 2–8 carbon atoms per molecule and a second section of a polymer of at least one olefin having 2-8 carbon atoms per molecule, said first section being unfoamable when the pressure thereon is reduced, said second section containing a foaming agent selected from the group consisting of N,N'-dinitrosopentamethylenetetramine, sodium carbonate, sodium bicarbonate, ammonium carbonate, ammonium bicarbonate, azodicarbonamide, 4,4'-oxybis(benzenesulfonyl hydrazide), azobisisobutylronitrile, benzene-1,3 - dissulfonylhydrazide, diazoaminobenzene, and barium azodicarboxylate, and being foamable when the pressure thereon is reduced, said first section comprising from 25 to 85 weight percent of said polymer feed, the remainder of said polymer feed being substantially said second section; providing a mold which is initially at a temperature of not more than 100° F. and which is at a pressure sufficiently below said elevated pressure of said polymer feed to cause said second section to foam when injected thereinto; and injecting said polymer feed into said mold so that said first section is injected first and said second section is injected after said first section.

2. The method according to claim 1 wherein said first section comprises from 25 to 45 weight percent of said polymer feed and said mold is initially at a temperature of from 50° to 80° F.

3. The method according to claim 1 wherein said first section is formed from a polymer or propylene, and said second section is formed from a polymer of ethylene.

4. The method according to claim 1 wherein said second section contains from 0.1 to 5 weight percent, based upon the total weight of said second section, of said foaming agent, and the mold is substantially at atmospheric pressure.

5. The method according to claim 4 wherein said first section is composed of a polymer of propylene, said second section is composed of a polymer of ethylene, and said second section contains azodicarbonamide as a foaming agent.

6. The method according to claim 5 wherein said first section comprises from 25 to 45 weight percent of said polymer feed, and said mold is initially at a temperature of from 50 to 80° F.

References Cited

UNITED STATES PATENTS

| | | | |
|---|---|---|---|
| 2,996,764 | 8/1961 | Ross | 264—328 X |
| 3,086,249 | 4/1963 | Nelson | 264—328 X |
| 3,211,605 | 10/1965 | Spaak | 264—48 X |
| 3,218,375 | 11/1965 | Hardwick | 264—48 X |
| 3,268,636 | 8/1966 | Angel | 264—48 X |
| 3,378,612 | 4/1968 | Dietz | 264—54 X |

DONALD J. ARNOLD, Primary Examiner

P. A. LEIPOLD, Assistant Examiner

U.S. Cl. X.R.

229—3.5; 264—54, 328